Oct. 8, 1935.   C. H. HOGAN   2,016,439
PROCESS OF MANUFACTURING GLASS CONTAINERS FOR LIQUID
Filed March 9, 1935   2 Sheets-Sheet 1
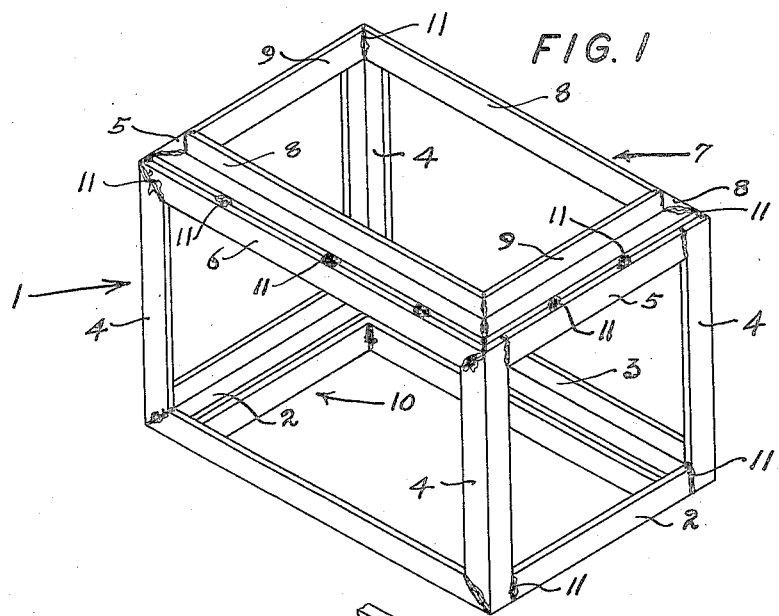
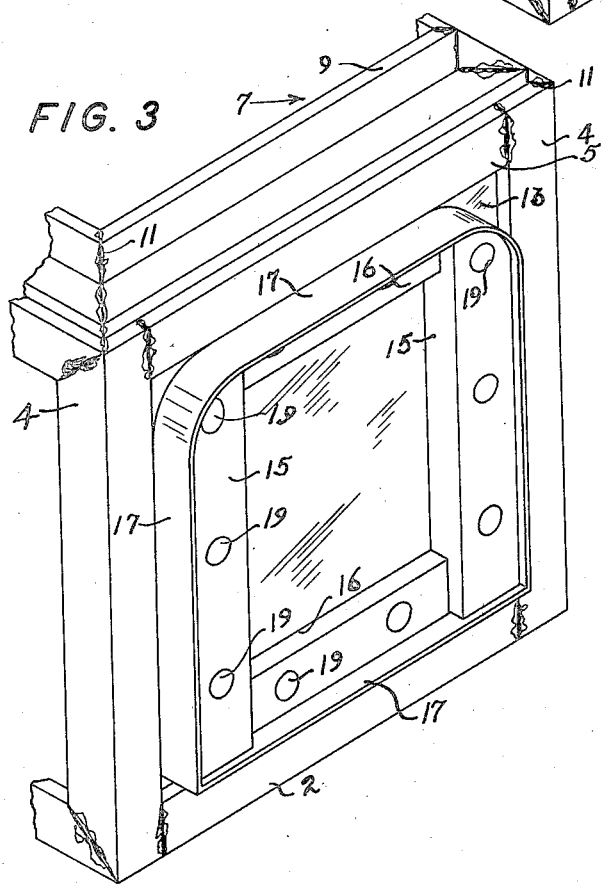
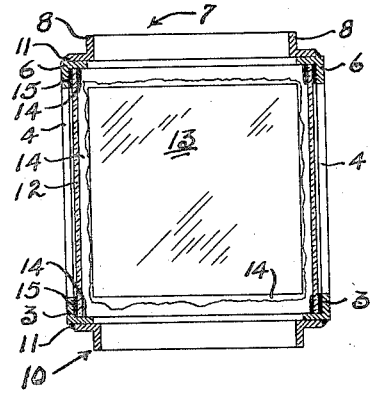
Clark H. Hogan
INVENTOR
BY
ATTORNEY Oct. 8, 1935. C. H. HOGAN 2,016,439
PROCESS OF MANUFACTURING GLASS CONTAINERS FOR LIQUID
Filed March 9, 1935 2 Sheets-Sheet 2

Clark H. Hogan
INVENTOR
BY Loyal J. Miller
ATTORNEY

Patented Oct. 8, 1935

2,016,439

UNITED STATES PATENT OFFICE 2,016,439

PROCESS OF MANUFACTURING GLASS CONTAINERS FOR LIQUID

Clark H. Hogan, Oklahoma City, Okla.

Application March 9, 1935, Serial No. 10,145

2 Claims. (Cl. 25—154)

My invention relates to the manufacture of glass walled containers for liquid, and more particularly to a process of constructing portable aquariums as articles of manufacture.

The prime object of the invention is the provision of a process of construction or manufacture, of devices of this class, which will permit a rough and unmachined construction of the metal framework, such frame afterward being covered so as to be completely hidden from the exterior.

At the present time portable aquariums are generally constructed with glass walls held in place by a metal frame. Since the frame is presented to view at all times it is necessary to make the meeting joints of the various pieces of the frame presentable, and also a costly metal material, such as nickel or other plate, must be used for appearance sake.

My construction makes it possible to utilize a rough framework of metal, and around this frame is poured a liquid material capable of becoming solidified after it has set.

The preferred material is a composition of matter similar to that disclosed in United States Patent Number 1,672,293, issued to Richard Hollis Allison on the 5th day of June, 1928. However, the construction could be carried out with cementitious materials if desired, or melted sulphur could be used with proper forms and sealing agents.

In carrying out the process I prefer to use, for forming around the frame, a material which has a coefficient of expansion substantially the same as that of the liquid. For instance, when using the composition set forth in the above mentioned patent, I use plate glass for the form work. If a cementitious material is used, I employ burnished sheet metal or highly polished laminated wood.

Another advantage of a hardenable liquid in covering the frame rests in the fact that conduit for electric wiring may also be imbedded in the material.

Other objects of the invention are the provision of a process of manufacture making it possible to produce an entirely new and novel article in the form of a glass walled container, the process being new, novel, practical and of utility; which will save unnecessary steps of operation, and losses in materials; and, which will be efficient in accomplishing all the purposes for which it is intended.

In order to illustrate clearly the various steps in the process two sheets of drawings are made a part hereof wherein:

Figure 1 is a perspective view of a roughly finished metal frame;

Figure 2 is a vertical sectional view taken through the frame intermediate its ends and showing the first step in the process;

Figure 3 is a fragmentary perspective view of one end of the frame;

Like characters of reference designate like parts in all the figures.

Figure 4:
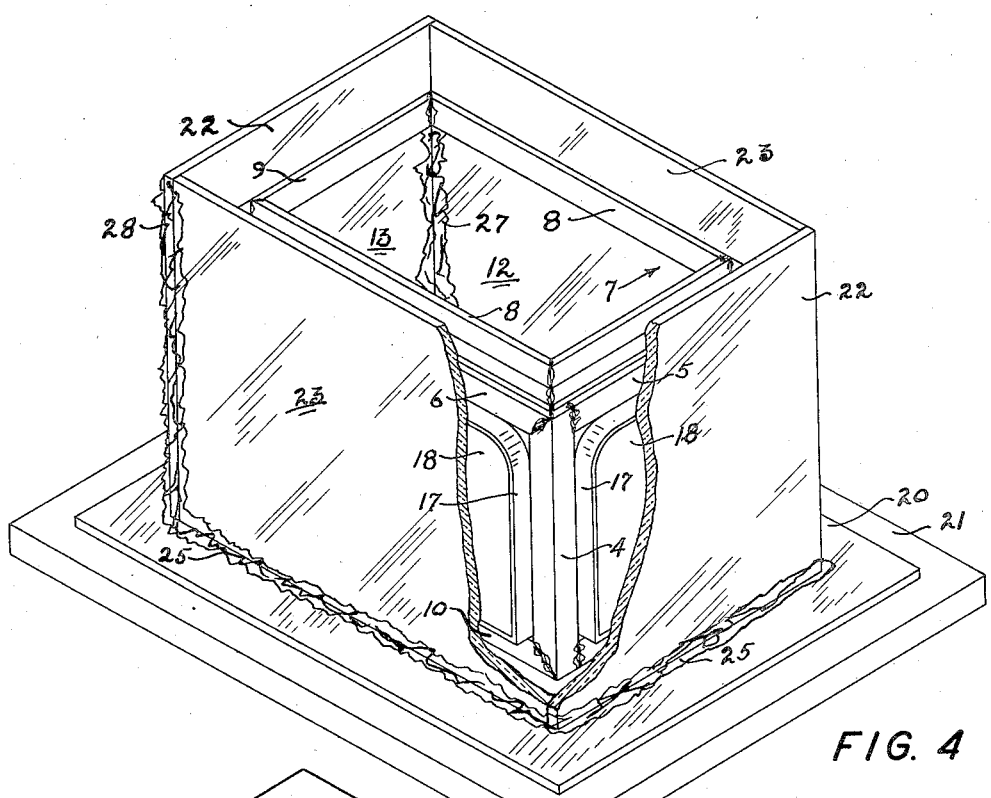
Figure 4 is a fragmentary view of the frame after the forms have been installed; and, Figure 5 is a perspective view of the completed article.
Figure 5:
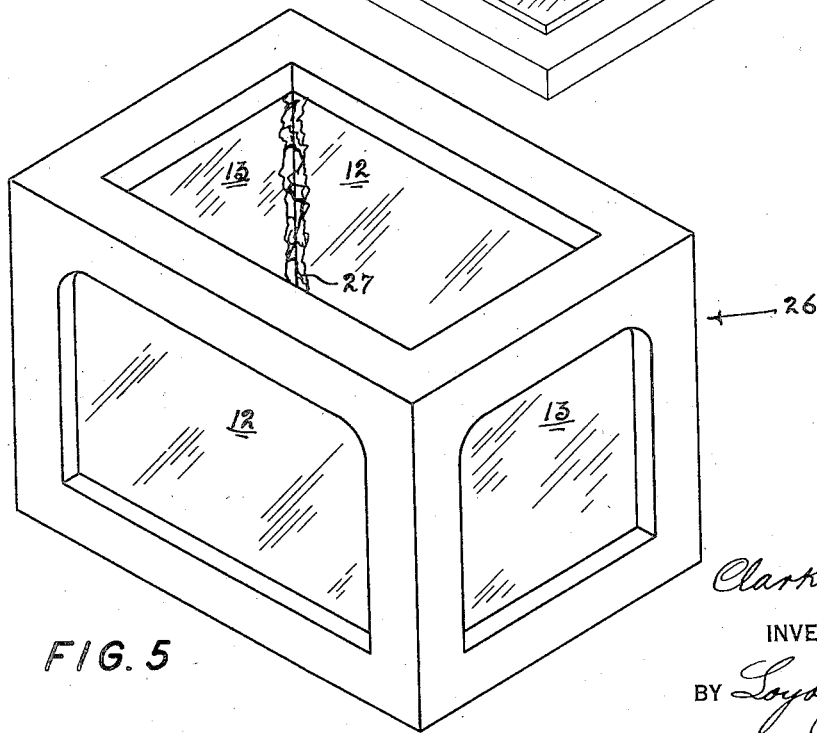

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

The first step in the process is the construction of a metal frame 1 preferably formed of angle iron strips welded together at and along their various meeting surfaces. The lower portion of the frame may include a rectangular base having two parallel angle iron end sills 2 and two parallel side sills 3 which are rigidly welded at their respective adjacent ends to the lower ends of four angle iron corner posts 4. The members forming the base all have one flange disposed horizontally and pointing inwardly and their other flanges point upwardly. The posts have one of their flanges in alinement with the upwardly projecting flanges of the end sills 2 and their other flanges in alinement with the upwardly projecting flanges of the side sills 3.

The upper ends of the posts 4 are rigidly welded to the respective ends of two end sills 5 and two side sills 6 which are similar respectively to the sills 2 and 3 therebelow except that the upper sills have one flange pointing inwardly and one pointing downwardly.

To the top of the upper sills 5 and 6 is welded a rectangular angle iron frame 7 composed of side sills 8 and end sills 9 having one of their flanges pointing upwardly and the other pointing outwardly. The frame 7 is preferably slightly less in length and breadth than is the frame 1. A second rectangular frame 10, similar to the frame 7 except that it is inverted, is welded to the lower faces of the lower sills 2 and 3. The frame work thus completed is identical at its top and bottom. Some of the welded joints are indicated by the reference numerals 11.

The second step in the process is the installation of the forms. The first operation of this step is the placing and sealing of the inner forms within the frame 1. A floor 30 is first placed upon the upper surface of the frame 10 between the inwardly projecting flanges of the sills 2 and 3 and is cemented or otherwise rigidly positioned. Next, a sheet 12, preferably of plate glass or highly burnished metal and of a proper dimension to fit snugly between the horizontal flanges of the upper and lower sills 3 and 6 and between the end posts 4 is placed in the frame 1 at each side thereof. An end form-sheet 13 of a size to fit snugly between the horizontal flanges of the sills 2 and 5 and of a length to fit between the sheets 12 is then placed within the frame 1 at each end thereof. The sheets are held rigidly in place by suitable cross-braces, not shown, preferably of the usual screw-jack type. A suitable sealing material such as wax, paraffin or the like, is placed along the inner surfaces of the sheets 12 and 13 at and adjacent their meeting points. This material is indicated (Fig. 2) by the reference numerals 14. A similar sealing substance is placed along the exterior of the sheets at the points at which they meet the inner surfaces of the sills 2, 3, 5 and 6. These points are indicated by the reference numerals 15.

The second step in the installation is the placing of suitable spacing forms upon the exterior surfaces of each of the sheets 12 and 13. As this operation is substantially identical the installation has only been illustrated in connection with one of the sheets (Fig. 3). Two side blocks 15 are first laid upon the sheet against the inner edges of the posts 4. These blocks are of a thickness greater than the thickness of the flanges of the posts, and may, if desired, be provided with curved upper and outer edges as shown. Lateral upper and lower spacing blocks 16 are placed upon the sheet to hold the blocks 15 in place. The blocks 15 and 16 are of a length to permit the insertion therearound of a flexible strip 17 of suitable material such as thick celluloid, sheet metal, or the like which is of a width slightly greater than the thickness of the blocks. The blocks are sealed by wax or other suitable material to the sheet 13. The blocks are next all covered with plaster of Paris 18 (Fig. 4) and the space between them is filled from the surface of the sheet 13 to the outer edge of the strip 17. The plaster of Paris is struck off smoothly even with the outer edge of the strip 17 and permitted to harden. It is preferable that the blocks 15 and 16 be provided with spaced through perforations 19 so that when the plaster of Paris hardens it forms a better anchor for the blocks. The perforations 19 may be filled with wax or other suitable material instead of the plaster of Paris in order to insure their proper adherence to the sheet 13.

The next operation of installing the forms is placing the frame completed as above described upon a smooth flat sheet 20 which is in turn resting upon a rigid base 21 such as a table top. When this is done only the lower edges of the vertically disposed flanges of the frame 10 will be contacting the sheet 20. The flanges of the frame 10 are next sealed to the sheet 20 along their inner surfaces. Two exterior end form-sheets 22 and two outer side form-sheets 23 are next placed upon their edges upon the sheet 20 and are clamped rigidly in place around the frame. Any suitable clamping means may be employed, for instance, usual flexible take-up bands similar to a usual hose-clamp, or usual carpenter's clamps may be used. The form-sheets should be of a width sufficient to extend upwardly above the upper edges of the vertical flanges of the frame 7.

The entire structure above described is next clamped rigidly to the base 21 by any suitable means, not shown. However, the means must be such that the complete frame is held against vertical movement within the sheets 22 and 23. A sealing material 25 is placed upon the sheet 20 at the points of contact with the outer form-sheets, and the vertical meeting points of the sheets are also properly sealed as illustrated at 28.

When the above operations have been accomplished the apparatus is in condition to receive a desired liquid or semi-liquid capable of becoming solidified when permitted to set.

A sufficient amount of the liquid is poured between one of the outer form-sheets and one of the vertical flanges of the frame 7 to completely fill the space around the frame from the upper surface of the sheet 20 to the upper edge of the frame 7.

When the material has hardened, the clamps, outer form-sheets, plaster of Paris 18, strips 17, and blocks 15 and 16 are all removed.

A solid, single piece structure 26 remains, and this structure then receives at both ends and sides the original interior form-sheets 12 and 13 or, if sheet metal or other material was originally used, it receives panes of glass of similar dimensions. These panes are cemented in place and at their meeting crevices are water-proofed by suitable material 27.

Obviously, electric wiring conduit may be imbedded in the liquid material before it hardens, or may be placed in position before the material is poured.

From the foregoing description it may be seen that a process has been disclosed that produces a new article of manufacture and that the finished article is not only more rigid in construction than any now produced, but requires a small amount of labor, and permits the use of a metal frame which requires no machining or other finishing.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the process herein described as fairly fall within the scope of my invention.

Having thus described my invention, what is claimed and desired to be secured by Letters Patent, is:

1. The process of manufacturing an aquarium frame including, constructing a marginal frame, placing interior form-sheets against the inner surfaces of the members forming the frame, placing spacing-forms between the respective side and the respective end members of the frame and against the respective form-sheets, sealing the form-sheets together at their meeting points, sealing the spacing-forms to the form-sheets, placing exterior side and end form-sheets about the frame and fastening them rigidly in place, sealing the exterior form-sheets at their meeting points, pouring a liquid capable of solidifying when permitted to set between the interior and exterior form-sheets and around the spacing forms, then permitting the liquid to set sufficiently to solidify, and removing the form structure.

2. The process of manufacturing glass walled vessels including, constructing a marginal frame, placing interior form-sheets against the inner surfaces of the members forming the frame, placing spacing-forms between the respective side and the respective end members of the frame to form openings and against the respective form-sheets, sealing the form-sheets together at their meeting points, sealing the spacing-forms to the form-sheets, placing exterior side and end form-sheets about the frame and fastening them rigidly in place, sealing the exterior form-sheets at their meeting points, pouring a liquid capable of solidifying when permitted to set between the interior and exterior form-sheets and around the spacing forms, permitting the liquid to set sufficiently to solidify, removing the forms, and then covering with glass the openings caused by the spacing forms.

CLARK H. HOGAN.